United States Patent Office 2,767,157
Patented Oct. 16, 1956

2,767,157

MANUFACTURE OF EPOXIDE RESINS

John E. Masters, Louisville, Ky., assignor to Devoe & Raynolds Company, Inc., Louisville, Ky., a corporation of New York No Drawing. Application April 6, 1953,
Serial No. 347,163

15 Claims. (Cl. 260—47)

This invention relates to improvements in the production of resins, and more particularly of high melting point high molecular weight resins, by the reaction of a dihydric phenol with epichlorhydrin in the presence of aqueous caustic alkali.

The improved process is of special value for the production of epoxide resins, and particularly of high melting point high molecular weight epoxide resins, which are valuable compositions for use in the manufacture of varnishes, molding resins, adhesives, films, fibers, etc.

The invention also includes a process of making high molecular weight high melting point resins with terminal phenolic hydroxyl groups by the reaction of a dihydric phenol in excess with epichlorhydrin and aqueous caustic alkali.

The invention also includes a process of producing high melting point high molecular weight resins from substantially equivalent proportions of dihydric phenol and epichlorhydrin in the presence of caustic alkali.

In the process of the present invention, a dihydric phenol is heated with epichlorhydrin in the presence of aqueous caustic alkali, with the addition to the reaction mixture of a small amount of an organic solvent which is insoluble or substantially insoluble in water but which is a solvent for the epichlorhydrin, and which at elevated temperatures is a solvent for or soluble in the hot resin produced, to produce an aqueous resin-solvent system including a taffy-like resin-solvent mixture layer and an aqueous layer. The aqueous layer is then removed without preliminary treatment of the taffy-like resin-solvent mixture layer, from the aqueous system, to yield a resin with admixed solvent which can be washed to remove salt and any excess alkali at a lower temperature or at a thinner consistency than resins produced in the absence of such organic solvent. Thereafter the resultant resin-solvent mixture is washed to produce a resin-solvent product which can be readily dried to remove water therefrom and which can also be readily freed from the organic solvent, or which can be directly used, without removal of the solvent, for making resin solutions by the addition of further amounts of solvent or solvents.

In the production of high melting point epoxide resins by the reaction of dihydric phenols, such as bisphenol, and epichlorhydrin in the presence of aqueous caustic alkali, there is a limit to the melting point of the resin which can be produced by a single stage operation. Epoxide resins having melting points up to around 115° C. can be produced and washed with hot water without the use of pressure. The production of higher melting point resins by a single stage process requires operating under pressure to produce the resin, and washing of the resin under pressure, and the use of higher temperatures of reaction for producing the resin and for washing the resin than the temperatures that can be utilized at atmospheric pressure.

High melting point epoxide resins can be produced by first producing low melting point epoxide resins and subsequently, by a separate reaction, reacting them with an amount of dihydric phenol less than that corresponding to the epoxide equivalent of the resins to produce a high melting point expoxide resin. But this two-step process requires the production and isolation of the low melting point resin and its further reaction, by a separate operation, with additional dihydric phenol.

The present process is particularly advantageous for the production of high melting point epoxide resins, melting above and materially above 100° C., and particularly resins having a melting point of around 115 to 150° C. or higher, in a single step process, and is carried out with the addition of a small amount of organic solvent which will lower the melting point of the resin produced and enable it to be produced at temperatures around the boiling point of water or lower, and with washing of the resin-solvent mixture with hot water at atmospheric pressure and temperatures around 100° C. or lower.

In the production of epoxide resins having a lower melting point, e. g., lower than around 100° C., the addition of a small amount of organic solvent results in the production of more fluid resin-solvent mixtures which can be more readily washed, or washed at lower temperatures, than the resins produced in the absence of such organic solvent.

The present process makes possible the reaction of dihydric phenols and epichlorhydrin, with the use of proportions of epichlorhydrin and dihydric phenol which are equal proportions or approximately equal proportions, or with only a small excess of epichlorhydrin or of dihydric phenol, which are difficult or impossible to produce in the absence of the added organic solvent. Thus, resins having a ratio of around 1 bisphenol to 1 epichlorhydrin, without the addition of an organic solvent, tend to set up to a gel or have such a high melting point that they are not readily washed to free them from salt and any excess alkali.

In the production of high melting point epoxide resins, the process of the present invention enables such resins to be directly produced by a one-step operation, without the preliminary production of a low melting point epoxide resin and a further and second reaction thereof with additional dihydric phenol.

The epoxide resins are produced by the reaction of a mixture of a dihydric phenol with epichlorhydrin and sufficient aqueous caustic alkali to combine with the chlorine of the chlorhydrin, using proportions of the chlorhydrin and dihydric phenol so as to give directly the final product desired by a one-step operation.

The invention is of particular value in the production of high melting point resins from dihydric phenols such as bisphenol (p,p'-dihydroxy diphenyl dimethyl methane) and epichlorhydrin, enabling not only resins having a melting point below 100° C. to be produced, but also resins having a melting point higher than 100° C., including new and valuable epoxide resins, having a melting point higher than 115° C. and up to around 150° C. or higher, in a single kettle operation and with a relatively short cooking time.

In making the high melting point epoxide resins from epichlorhydrin or glycerol dichlorhydrin and dihydric phenols, somewhat more than 1 molecular proportion of the chlorhydrin is used for 1 molecular proportion of dihydric phenol. With higher proportions of chlorhydrin, lower melting point resins are obtained. With proportions approaching a 1:1 ratio, higher melting point resins are obtained. The process of the present invention is particularly advantageous for the production of high melting point resins where the ratio of chlorhydrin to dihydric phenol such as bisphenol is more than 1:1, but in general less than 1.2:1.

In carrying out the process, the polyhydric phenol and the dichlorhydrin or other chlorhydrin are advantageously reacted with the use of aqueous caustic alkali in amount sufficient to combine with the chlorine of the chlorhydrin, or in amount somewhat in excess. Thus, where the dihydric phenol is reacted with epichlorhydrin, the proportion of alkali used is sufficient to combine with the chlorine of the epichlorhydrin and advantageously somewhat in excess of that amount. When glycerol dichlorhydrin is used with the dihydric phenol, the amount of alkali is sufficient to combine with the chlorine of the dichlorhydrin or advantageously somewhat in excess of that amount.

The reaction of the dihydric phenol and epichlorhydrin or glycerol dichlorhydrin appears to be mainly a reaction which results in straight chain polymeric products such as illustrated by the following formula:

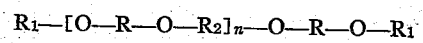

where R is the residue of a dihydric phenol, $R_2$ is an intermediate hydroxyl-containing residue of the chlorhydrin or dichlorhydrin, $R_1$ is mainly an epoxy-containing residue, and n represents the degree of polymerization. The high melting point resins are in the nature of diepoxides, i. e., polymeric diglycid ethers of the dihydric phenols.

The above formula of the high melting point polymeric epoxide resins assumes a straight line reaction which appears to be the primary reaction between the dihydric phenol and epichlorhydrin or dichlorhydrin. Reaction is not, however, excluded between the halohydrin and intermediate alcoholic hydroxyl groups such as would give branch chain formulae.

It is difficult to determine the exact nature of the complex polymerization process which takes place but I am led to believe that the reaction is primarily one between the phenolic hydroxyls and the chlorhydrins and to a limited extent one of reaction of halohydrins or epoxide groups with aliphatic hydroxyl groups, and that the resulting complex hydroxy-epoxy compositions are largely straight-chain polymeric products of the formula indicated above and to some extent more complex polydimensional structures.

The dihydric phenols used in making the high melting point epoxide resins may contain the hydroxyl groups in one nucleus as in resorcinol or in different nuclei of fused ring systems as in 1,5-dihydroxynaphthaline or in different nuclei or rings systems attached by chains composed of one or more atoms, in which case the chains should be free from elements which interfere with the reaction of chlorhydrins with the phenolic hydroxyl groups. The dihydric phenols may contain the phenolic hydroxyls in nuclei separated by an aliphatic alcoholic hydroxyl group, such as the group —$CH_2CHOHCH_2$—, which dihydric phenols are produced by the reaction of a dihydric phenol with less than the equivalent proportion of epichlorhydrin and caustic alkali sufficient to combine with the chlorine of the epichlorhydrin. The phenolic nuclei or the chains linking phenolic nuclei may contain substituents provided they do not interfere with the desired reaction of the chlorhydrins with the phenolic hydroxyl groups. Illustrative of dihydric phenols which may be used in making the new complex polymerization products are mononuclear phenols such as resorcinol, hydroquinone, catechol, etc. and polynuclear phenols such as bisphenol (p,p'-dihydroxydiphenyl dimethyl methane), p,p'-dihydroxybenzophenone, p,p'-dihydroxydiphenyl, p,p'-dihydroxydibenzyl, bis-(4-hydroxyphenyl) sulfone, 2,2'-dihydroxy 1,1'-dinaphthyl methane, polyhydroxy naphthalenes and anthracenes, o,p,o', p'-tetrahydroxy diphenyl dimethyl methane and other dihydroxy or polyhydroxy diphenyl or dinaphthyl methanes, etc.

A particular advantageous polyhydric phenol for use in carrying out the single stage process of the present invention is bis-phenol (p,p'-dihydroxydiphenyldimethyl methane).

In making the high melting point epoxide resins, the dihydric phenol, e. g., bis-phenol, and the polyfunctional chlorhydrin, e. g., epichlorhydrin, are advantageously mixed together at the outset, together with aqueous alkali which may be used to dissolve or partly dissolve the dihydric phenol to form the polyphenoxide or a monophenoxide either before admixture with the chlorhydrin or after admixture. The amount of caustic alkali added to dissolve or partially dissolve the phenol, and whether present at the outset or added in successive amounts, should be sufficient to combine with the chlorine of the chlorhydrin used. With epichlorhydrin for example the amount of caustic alkali should be equal to or somewhat in excess of the theoretical amount for combining with the chlorine of the epichlorhydrin. With glycerol dichlorhydrin 2 mols of caustic alkali or somewhat more are required for 1 mol of the dichlorhydrin. The presence of an excess of alkali is advantageous in securing completion of the reaction, and also influences the polymerization and the nature of the polymerization products as well as the relative proportions of epoxide groups and terminal hydroxy-containing groups.

Products of somewhat different melting points and different degrees of polymerization can be obtained by regulating the proportions of the reactants used. For making the high melting point high molecular weight epoxide resins, the proportion of epichlorhydrin to dihydric phenol, e. g., bis-phenol, should be somewhat in excess of 1:1, but should not be too large an excess. With bis-phenol, as above indicated, the excess of epichlorhydrin should, in general, be less than 1.2 to 1. The yields of resin obtained represent or approximate the theoretical yields, indicating that the complex polymerization products contain the phenolic and chlorhydrin residues in substantially the same proportions in which the reactants are used.

The solvents which are added in small amount to the reaction mixture to give a resin containing a small amount of solvent, with a materially thinner consistency or lower melting point than the resins without the solvent, are solvents which are insoluble in water or substantially insoluble but which are solvents for epichlorhydrin and which are solvents for the hot resin produced or are soluble in the hot resin produced, to form a resin-solvent mixture. Such solvents as high-flash naphtha, xylene, mineral spirits and toluene are particularly advantageous. High boiling ethers and ketones which do not contain reactive groups but which are insoluble or of limited solubility in water such as cyclohexanone and di-n-butyl ether can also be used but are less desirable. In general, the boiling point of the solvents should be above the boiling point of water, and below the temperature at which the reaction is carried out. Where the solvent is to be removed from the resin, it should not have too high a boiling point, e. g., materially above 150° C., where the resin is to be dried at that temperature. Solvents having boiling points between 100 and 150° C. can thus be used where the reaction is carried out at around the boiling point of water or somewhat lower, and such solvents can be removed by normal distillation methods.

Solvents having a boiling point somewhat above the boiling point of water are advantageously used, such that when the production of the resin is completed and the resin-solvent mixture has been washed to free it from salt and any excess alkali, it can be dried to remove the water by heating to distill off the water together with the solvent and the presence of the solvent facilitates the drying and removal of the water after the washing operation is completed.

The solvent may advantageously be one which can be permitted to remain in the resin and which will serve as part of the solvent for making a solution of the resin for varnishes or other purposes. In drying the washed resin-solvent mixture, the drying can advantageously be carried out with reflux distillation and the use of a water trap which separates the water and returns the solvent so that the solvent will be condensed and returned and will be present in the dried resin. The solvent can be subsequently distilled off and recovered for reuse or can be left with the resin as part of the solvent of the resin in its subsequent use.

The amount of organic solvent used in carrying out the process is relatively small, and in general will not exceed about 20% of the resin formed, and may advantageously be a much lower amount, e. g., around 10% or, in some cases, as little as 5% or 2%. The pronounced effect of the solvent in lowering the melting point of the resin is illustrated by adding small and varying amounts of a solvent to a high melting point epoxide resin. For example, the addition of 5% of high flash naphtha to an epoxide resin having a melting point of 129° C. lowered the melting point of the resin-solvent mixture to around 103° C., while the addition of 10% of high flash naphtha lowered the melting point to around 84° C. The addition of 5% cyclohexanone lowered the melting point of the same resin to around 105° C., and the addition of 5% of butyl cellosolve similarly lowered the melting point of the resin to around 105° C.

In using the solvents, they are advantageously added at the beginning of the reaction, for example, by dissolving the epichlorhydrin in the solvent and using the resulting solution for reaction with the aqueous caustic alkali solution of the dihydric phenol. In the production of low melting point resins, the addition of such a solvent gives a resin which is thinner in consistency at the temperature of production and which can be washed at a materially lower temperature than can the resin when produced without the presence of a solvent.

In the production of high melting point resins, melting above 100° C., and particularly resins melting at around 115° C., or higher, the presence of the solvent has a modifying effect on the process, and particularly so where the resins have such a high melting point that they cannot be readily washed with hot water at atmospheric pressure. Resins which, in the absence of the solvent, would become so thick and stiff that the taffy-like product would be difficult or impossible to wash at atmospheric pressure are lowered in their melting point to a temperature such that they can readily be produced and washed at atmospheric pressure, i. e., at 100° C., or lower. The presence of the solvent makes it possible to complete the process without overheating and without going to the use of higher temperatures and pressures for carrying out the process.

While the solvent is advantageously added at the beginning of the process, it can be added at an intermediate stage. With high melting point resins, the solvent is advantageously added to the initial reaction mixture, particularly where the resin produced has a melting point materially above 100° C.; for the presence of the solvent makes it unnecessary to carry the process to higher temperatures to complete the reaction and gives a final resin-solvent mixture which can be readily washed with hot water at atmospheric pressure. With high melting point resins, the use of the solvent also appears to modify the reaction in the direction of producing a high melting point resin of lower epoxide equivalent than when the solvent is not used, i. e., with a higher proportion of epoxide groups for a given molecular weight; and it enables the higher melting point resins to be produced without the overheating and further reaction which would take place in the absence of the solvent and without heating to higher temperatures to complete the reaction.

The resins, and particularly the higher melting point resins, are taffy-like products which can be washed, even when an organic solvent is not used, at temperatures somewhat below the melting point of the resins. But with the addition of an organic solvent, the resin is thinner in consistency and more readily washed at the same temperature, or can advantageously be washed at a lower temperature.

The use of the solvent during the cooking operation for producing the resins tends to prevent local overheating or overpolymerization by allowing for more uniform agitation and also volatilization of the solvent at local overheated areas, with resulting tendency to prevent overpolymerization which would otherwise occur at these areas.

The production of high melting point epoxide resins having a melting point above 100° C. is illustrated by the following examples, but it will be understood that the invention is not limited thereto.

*Example 1.*—In a 2 gallon kettle provided with a mechanical stirrer and thermometer was placed 1520 g. water, 176 g. sodium hydroxide and 654 g. Bisphenol-A. After several minutes agitation and cooling to 50° C., 305 g. epichlorhydrin mixed with 85 g. hi-flash naphtha was added to the reaction mixture. (Ratio of 1.15 mols epichlorhydrin per mol of Bisphenol-A with 10% solvent in the formulation). With a combination of exothermic heat of reaction and external heat the reaction temperature was brought to 95° C. and held during a 60 minute reaction period at 95–100° C.

The mother liquor was decanted from the product and taffy resin washed free of alkali and salt with hot water at 90° C. During the washing periods the resin was continuously agitated. After nine separate washings the wash water tested neutral to litmus. As much water as possible was removed from the kettle by decantation and the resin dried by heating with agitation to 200° C. The hot resinous product was poured into a pan to cool.

The cold product was a hard, brittle, resinous solid. Analysis showed that the resin contained 0.5% solvent, had a Durran's melting point of 118° C., and a weight per epoxide of 1128, and a chlorine content of 0.035%.

The washing of the resin of this example was also carried out at 70–75° C., and a resin of similar melting point and epoxide value obtained. The presence of the solvent enables the resin to be washed at lower temperatures than without the solvent, and also facilitates the washing by making the resin more fluid at higher washing temperatures.

The addition of a similar amount of solvent before the end of the reaction also gave a resin-solvent blend that could be more readily washed, and at a lower temperature.

*Example 2.*—In a 7½ gallon steam jacketed kettle provided with a heavy duty anchor type agitator, thermometer, hot water inlet, adjustable level water take off, air pressure regulator, vapor outlet line, batch loading port and sight glass in the top of the kettle was placed 8660 g. water, 1210 g. caustic soda (76% $Na_2O$), 13.6 g. sodium orthosilicate and 5160 g. Bisphenol-A. After several minutes agitation at 49° C., 2400 g. epichlorohydrin mixed with 661 g. hi-flash naphtha was added to the reaction mixture. (Ratio of 1.15 mols epichlorhydrin per mol of Bisphenol-A with 10% solvent in the formulation.) With a combination of exothermic heat of reaction and external heat the reaction temperature was brought over a period of 25 minutes to 95° C. and held during a 60 minute reaction period at 95–100° C.

The mother liquor was decanted from the product and the taffy resin washed free of salt and alkali by introducing hot (82–85° C.) water to the kettle and simultaneously allowing water to flow from the kettle. During the washing period the resin was continuously agitated. After 3 hours of continuous washing, the water coming from the kettle was neutral. The washing was discontinued, as much water as possible was removed from the kettle by syphoning and the resin dried by heating to 150° C. with continuous agitation. The hot resinous product was poured into a pan to cool.

The cold product was a hard, brittle, resinous solid. Analysis showed that the product contained 0.1% solvent, had a Durran's melting point of 108° C., a weight per epoxide of 1031.5 and a chlorine content of 0.07%.

A 40% solution of the product in butyl carbitol had a viscosity of U—V and a color of 6.

15% urea-formaldehyde resin (Beetle 216—8, supplied by American Cyanamid Co.) based on resin solids, was added to a solution of the product. A 3 mil film was drawn on glass and baked 30 minutes at 150° C. The film showed good flexibility and toughness.

15% urea-formaldehyde resin (Beetle 216—8) based on resin solids, was added to a 29.6% solution of the product. A 12 mm. pfund gauge film was drawn on tin panels and baked 10 minutes at 400° F. Bottle caps were formed out of the tin panels and tested and also the tin panels were tested. The bottle caps and panels exhibited good qualities of flow, dry, hardness, toughness, adhesion, and flexibility.

The drying of the resin at 150° C. gave a somewhat lower melting point resin and epoxide equivalent than drying at 200° C. as in Example 1.

*Example 3.*—In a 2 gallon kettle provided with a mechanical stirrer and thermometer was placed 1520 g. water, 176 g. sodium hydroxide and 672 g. Bisphenol-A. After several minutes agitation and cooling to 56° C., 305 g. epichlorohydrin mixed with 85 g. hi-flash naptha was added to the reaction mixture. (Ratio of 1.119 mols epichlorohydrin per mol Bisphenol-A with 10% solvent in the formulation.) With a combination of exothermic heat of reaction and external heat the reaction temperature was brought to 95° C. and held during a 60 minute reaction period at 95–100° C.

The mother liquor was decanted from the product and the taffy resin washed free of alkali and salt with hot water at 90° C. During the washing periods the resin was continuously agitated. After eight separate washings the wash water was neutral to litmus. As much water as possible was removed from the kettle by decantation and the resin dried by heating with agitation to 200° C. The hot resinous product was poured into a pan to cool.

The cold product was a hard, brittle, resinous solid. Analysis showed that the product contained 1% solvent and had a Durran's melting point of 112° C., a weight per epoxide of 1272, and a chlorine content of 0.018%.

*Example 4.*—In a 7½ gallon steam jacketed kettle provided with a heavy duty anchor type agitator, thermometer, hot water inlet, adjustable level water take off, air pressure line with gage and pressure regulator, vapor outlet line, batch loading port and sight glass in the top of the kettle, was placed 9070 g. water, 1180 g. caustic soda (76% Na₂O), 13.6 g. sodium orthosilicate, and 5420 g. Bisphenol-A. After several minutes agitation at 50° C. 2310 g. epichlorohydrin mixed with 680 g. hi-flash naphtha was added to the reaction mixture. (Ratio of 1.05 mol epichlorohydrin per mol Bisphenol-A with 10% solvent in the formulation.) With a combination of exothermic heat of reaction and external heat the reaction temperature was brought to 92 to 96° C. and held during a 60 minute reaction period at 93–96° C.

The mother liquor was decanted from the taffy resin and the product washed free of alkali and salt by introducing hot (93–96° C.) water to the kettle and simultaneously allowing water to flow from the kettle. During the washing period the resin was continuously agitated. In order to force the taffy resin to the bottom of the kettle the kettle pressure was held at 30 lbs. p. s. i. by introducing compressed air into the kettle. After 2½ hours of continuous washing the water coming from the kettle was neutral. The washing was discontinued, as much water as possible was removed from the kettle by syphoning and the resin dried by heating to 160° C. The hot resinous product was poured into a pan to cool.

The cold product was a hard, brittle, resinous solid. Analysis showed that the product contained 0.1% solvent, had a Durran's melting point of 118° C., a weight per epoxide of 1845, and a chlorine content of 0.07%.

A 40% solution of the product in butyl carbitol had a viscosity of Y—Z and a color of 6—7.

15% urea-formaldehyde resin (Beetle 216—8, supplied by American Cynamid Co.) based on resin solids, was added to a solution of the product. A 3 mil film was drawn on glass and baked 30 minutes at 150° C. The film showed excellent flexibility and toughness.

15% urea-formaldehyde resin (Beetle 216—8) based on solids, was added to a 29.6% solution of the product. A 12-mm. pfund gauge film was drawn on tin panels and baked 10 minutes at 400° F. Bottle caps were formed out of the tin panels and tested and also the tin panels were tested. The bottle caps and panels exhibited superior qualities of flow, dry, hardness, toughness, adhesion and flexibility and no blushing or lifting on processing 1 hour in boiling water.

The high melting point resin of this example would be difficult or impossible to produce and wash at ordinary pressures without the solvent, but the presence of the solvent makes it possible to carry out the reaction and wash the resin-solvent mixture without difficulty at temperatures below 100° C. and to obtain resins of lower melting point and lower epoxide equivalent than where the resin is produced by the two-step process above referred to, or by a single-step process carried out under pressure at higher temperatures.

When the resin of this example was dried and heated at 200° C. for a further period of time, the melting point and epoxide equivalent increased somewhat, e. g., after about half an hour, to about 133° C. melting point and an epoxide equivalent of around 2325, indicating that somewhat further reaction or polymerization took place during this further heating.

The following examples illustrate the production of lower melting point epoxide resins, melting below 100° C. The use of the solvent in the production of such low melting point resins does not have the advantages which it does in producing the high melting point resins, but nevertheless has the advantage of producing a resin-solvent blend which is more fluid than the resin produced at the same temperature without the presence of the solvent and enables the resins to be washed more readily at the same temperature or at much lower temperatures.

*Example 5.*—In a 2 gallon kettle provided with a mechanical stirrer and thermometer was placed 1500 g. water, 124 g. sodium hydroxide and 500 g. of the commercial mixture of the isomeric p,p'- and the o,p'-dihydroxy diphenyl sulfones known as Bisphenol-S. After several minutes agitation at 47° C., 277.5 g. epichlorohydrin mixed with 34 g. di-n-butyl ether were added to the reaction mixture. (Ratio of 3 mols epichlorohydrin: 2 mols Bisphenol-S with 5% solvent in the formulation). With a combination of exothermic heat of reaction and external heat of reaction the mixture was brought to a temperature of 98° C. in a period of 24 minutes.

The mother liquor was decanted from the product and the taffy resin washed free of alkali and salt with warm water at 100° C. After separate washings, the solution was made slightly acid with dilute sulfuric acid. The product was washed once more with water. As much water as possible was removed from the kettle by decantation and the resin dried by heating with agitation.

The hot resinous product was poured into a pan to cool. Analysis showed that the resin contained 0.1% solvent at a Durran's melting point of 124° C. and a weight per epoxide of 540.

*Example 6.*—In a 2 gallon kettle provided with a mechanical stirrer and thermometer was placed 2000 g. water, 124 g. sodium hydroxide and 625 g. of the commercial mixture of the isomeric p,p' - and the o,p' - dihydroxy diphenyl sulfones known as Bisphenol-S. After several minutes agitation at 44° C., 277.5 g. epichlorohydrin mixed with 158.6 g. cyclohexanone were added to the reaction mixture. (Ratio of 3 mols epichlorohydrin: 2.5 mols Bisphenol-S with 20% solvent in the formulation). With a combination of exothermic heat of reaction and external heat the reaction temperature was brought to 96° C. and held during a 5 minute reaction period at 96°–100° C.

The mother liquor was decanted from the product and the taffy resin washed free of alkali and salt with water at 100° C. After three separate washings, the solution was made slightly neutral with dilute sulfuric acid. The product was washed once more with water. As much water as possible was removed from the kettle by decantation and the resin dried by heating with agitation to 150° C. The hot resinous product was poured into a pan to cool.

Analysis showed the resin contained 0.7% solvent at a Durran's melting point of 138° C. and a weight per epoxide of 1138.

*Example 7.*—In a 2 gallon kettle provided with a mechanical stirrer and thermometer was placed 1900 cc. water, 213 g. sodium hydroxide, and 536 g. Bisphenol-A. After several minutes agitation and cooling to 51° C., 436 g. epichlorohydrin mixed with 80 g. hi-flash naphtha was added to the reaction mixture. (Ratio of 2 mols epichlorohydrin per mol Bisphenol-A with 10% solvent in the formulation). With a combination of exothermic heat of reaction and external heat the reaction temperature was brought to 95° C. and held during a 60 minute reaction period at 95°–100° C.

The mother liquor was decanted from the product and the taffy resin washed free of alkali and salt with warm water at about 40° C. During the washing periods the resin was continuously agitated. After eleven separate washings the wash water was neutral to litmus. As much water as possible was removed from the kettle by decantation and the resin dried by heating with agitation to 150° C. The hot resinous product was poured into a pan to cool.

Analysis showed that the product contained 0.3% solvent and had a Durran's melting point of 53° C., a weight per epoxide of 381, and a chlorine content of 0.081%.

*Example 8.*—In a 2 gallon kettle provided with a mechanical stirrer and thermometer was placed 2000 g. water, 168 g. sodium hydroxide and 385 g. resorcinol. After several minutes agitation at 47° C., 370 g. epichlorohydrin mixed with 18 g. mineral spirits were added to the reaction mixture. (Ratio of 4.0 mols epichlorohydrin: .5 mols resorcinol with 3% solvent in the formulation). With the combination of exothermic heat of reaction and external heat of reaction the temperature was brought to 98° C. and held during a 30 min. reaction period at 97°–100° C.

The mother liquor was decanted from the product and the taffy resin washed free of alkali and salt with water at about 70° C. When the wash water was neutral to litmus, as much water as possible was removed from the kettle by decantation and the resin dried by heating with agitation to 150° C. Hot resinous product was poured into a pan to cool.

Analysis showed that the resin contained 1.1% solvent and had a Durran's melting point of 73° C. and a weight per epoxide of 1177.

40% solution of the product in butyl carbitol had a viscosity of Q—R and a color of 6.

*Example 9.*—In a 7½ gallon steam jacketed kettle provided with a heavy duty anchor type agitator, thermometer, hot water inlet, adjustable level water take off, air pressure line with gage and pressure regulator, vapor outlet line, batch loading port and sight glass in top of kettle was placed 29.35 lbs. of water, 2.91 lbs. caustic soda (76% $Na_2O$), 0.03 lb. sodium orthosilicate, and 11.95 lbs. Bisphenol-A. After 25 minutes agitation at 50° C., 5.89 lbs. epichlorohydrin mixed with 1.50 lb. hi-flash naphtha (Solvesso–100) was added to the reaction mixture. (Ratio of 1.22 mols epichlorohydrin per mol Bisphenol-A with 10% solvent in the formulation.) After 25 minutes, during which time the temperature raised exothermically to 84° C., the heat was turned on and the kettle temperature brought to 93° C. in 8 minutes. The reaction mixture was held at a temperature of 93°–96° C. during a 30 minute reaction period. After this period, a compressed air pressure of 30 p. s. i. was applied to the kettle to sink the resin and was held during the washing period.

The mother liquor was decanted from the taffy resin by syphoning and the product washed free of alkali and salt by introducing warm (80° C.) water to the kettle and simultaneously allowing water to flow from the kettle. The resin was agitated continuously during the washing period. After 2 hours of continuous washing the water coming from the kettle was neutral. The washing was discontinued, as much water as possible was drawn from the kettle by syphoning and the resin dried by heating to 150° C.

The hot resinous product was poured into a pan to cool. Analysis showed that the product contained 0.6% solvent, had a Durran's melting point of 86.5° C., and a weight per epoxide of 759.

A 40% solution of the product in butyl carbitol had a viscosity of J—K and a color of 6.

*Example 10.*—A resin prepared similarly to the resin of Example 9, but containing 1% solvent, had a Durran's melting point of 82° C., and a weight per epoxide of 736.5.

A 40% solution of this product in butyl carbitol had a viscosity of I—J and a color of 4.

When the process of the above examples (9 and 10) was carried out without the solvent, a higher melting point resin was obtained, melting at 98° C., and the resin had a higher weight per epoxide of 947.

A 40% solution of this resin in butyl carbitol had a viscosity of S and a color of 4—4.

The following examples illustrate the production of resins from approximately equal ratios of dihydric phenol and epichlorhydrin.

*Example 11.*—In a 2 gallon kettle provided with a mechanical stirrer and thermometer was placed 2 liters water, 158 g. sodium hydroxide and 684 g. Bisphenol-A. After several minutes agitation at 48° C., 278 g. epichlorohydrin mixed with 85 g. hi-flash naphtha was added to the reaction mixture. (Ratio of 1 mol epichlorohydrin per mol Bisphenol-A, 15% excess sodium hydroxide and 10% solvent in the formulation.) With a combination of exothermic heat of reaction and external heat the reaction temperature was brought to 95° C. and held during a 2 hour reaction period at 95–101° C.

The mother liquor was decanted from the product and the taffy resin washed free of alkali and salt with hot water at 100° C. During the washing periods the resin was continuously agitated and heated. After four separate washings the solution was neutralized with sulfuric acid and washed once with water. As much water as possible was removed from the kettle by decantation and the resin dried by heating with agitation to 150° C. The hot resinous product was poured into a pan to cool.

The cold product was a hard, brittle, resinous solid. Analysis showed that the product contained 1.2% solvent, had a Durran's melting point of 128° C., a weight per epoxide of 3109 and a chlorine content of 0.07%.

A 40% solution of the product in butyl carbitol had a viscosity of $Z_1$–$Z_2$ and a color of 7.

The theoretical amount of sodium phenoxide required to react with the chlorine in the resin plus 1% based on resin solids was added to a 40% solution of the resin. A 3 mil film was drawn on glass and baked 30 minutes at 150° C. The converted film had fair flexibility and mar resistance.

15% urea-formaldehyde resin (Beetle 216—8, supplied by American Cyanamide Co.) and 1% of the morpholine salt of para-toluene sulfonic acid as a catalyst, based on resin solids, was added to a 40% solution of the resin. A 3 mil film was drawn on glass and baked 10 minutes at 200° C. The film showed superior flexibility and mar resistance.

2% tetraethylene pentamine, based on resin solids, was added to a 40% solution of the resin. A 3 mil film was drawn on glass and baked 30 minutes at 150° C. The film showed excellent flexibility and mar resistance.

*Example 12.*—In a 2 gallon kettle provided with a mechanical stirrer and thermometer was placed 2 liters water, 20 g. sodium hydroxide and 684 g. Bisphenol-A. After several minutes agitation at 37° C., 278 g. epichlorohydrin mixed with 85 g. hi-flash naphtha was added to the reaction mixture and the heat turned on low. After 18 minutes when the temperature had reached 43° C., 84 g. sodium hydroxide was added and after 5 more minutes, when the temperature had reached 65° C., 20 g. sodium hydroxide was added. (Ratio of 1 mol epichlorohydrin per mol Bisphenol-A, theoretical amount of sodium hydroxide and 10% solvent in the formulation.) With a combination of exothermic heat of reaction and external heat the reaction temperature was brought to 95° C. and held during a 30 minute reaction period.

The mother liquor was decanted from the product and the taffy resin washed free of alkali and the salt with hot water. During the washing periods the resin was continuously agitated and heated at 60° C. After two separate washings, the solution was neutralized with sulfuric acid and washed 3 times more with water. As much water as possible was removed from the kettle by decantation and the resin dried by heating with agitation to 150° C. The hot resinous product was poured into a pan to cool.

The cold product was a soft, brittle, clear, amber colored resin. Analysis showed that the product contained 1.84% solvent, had a Durran's melting point of 79° C., a weight per epoxide of 1094 and a chloride content of 0.57%.

A sample of the resin was heated with stirring at 150° C. for 1 hour. Analysis showed that this product contained 1.2% solvent, had a Durran's melting point of 93° C. and a weight per epoxide of 1291.

*Example 13.*—In a 2 gallon kettle provided with a mechanical stirrer and thermometer was placed 2 liters water, 20 g. sodium hydroxide and 684 g. Bisphenol-A. After several minutes agitation at 31° C., 278 g. epichlorohydrin mixed with 85 g. hi-flash naphtha was added to the reaction mixture and the heat turned on low. After 30 minutes, when the temperature had reached 37° C., 115 cc. of a 34.2% solution (104 g. NaOH in 200 cc. H₂O) sodium hydroxide was added, the heat turned off and after 15 minutes when the temperature had risen exothermically to 51° C., the remainder of the 34.2% sodium hydroxide solution added. (Ratio of 1 mol Bisphenol-A, 1 mol sodium hydroxide and 1 mol epichlorohydrin with 10% solvent in the formulation.) The reaction mixture was held 45 minutes longer at 51–57° C. with exothermic heat of reaction.

The resin solution was transferred to a separate vessel for washing. The resin did not go into solution when 700 cc. xylene was added to the solution. The resin was still not in solution after 75 cc. methyl cellosolve was added. The water and resin layers were separated. The water layer required 110 g. 20% sulfuric acid solution to neutralize it and the resin layer required 62 g. 20% sulfuric acid solution to neutralize it. The resin layer was washed four times with water at 25° C. to free it of salt. The water and resin layers were separated and the remaining water and solvent removed by vacuum distillation at water pump pressure to 90° C.

The reaction product was a soft, clear, amber colored resin. Analysis showed that the product contained 6.3% solvent, had a Durran's melting point of 50° C., a weight per epoxide of 982 and a chlorine content of 1.95%.

A 40% solution of the product in butyl carbitol had a viscosity of A—B and a color of 6.

A sample of the resin was heated with stirring at 150° C. for 1 hour. Analysis showed that the product contained 0.1% solvent, had a Durran's melting point of 70° C. and a weight per epoxide of 998.

The solvent was removed from the product by heating at 150° C. for four hours and gave a resin of 77° C. melting point and an epoxide equivalent of 1329.

The present process also makes possible the production of new and distinctive resins, which are not epoxide resins but which are phenol terminated resins, with the use of an excess of dihydric phenol somewhat in excess of the equivalent proportions and with the production of high melting point resins of this type.

*Example 14.*—In a 7½ gallon steam jacketed kettle provided with a heavy duty anchor type agitator, thermometer, hot water inlet, adjustable level water take off, air pressure line with gage and pressure regulator, vapor outlet line, batch loading port and sight glass in the top of the kettle was placed 9,070 g. water, 1083 g. caustic soda (76% Na₂O), 13.6 g. sodium orthosilicate, and 5530 g. Bisphenol-A. After several minutes agitation at 50° C., 2125 g. epichlorohydrin mixed with 680 g. hi-flash naphtha was added to the reaction mixture. (Ratio of 1.05 mols Bisphenol-A per mol epichlorohydrin with 10% solvent in the formulation). With a combination of exothermic heat of reaction and external heat the reaction temperature was brought over a period of 10 minutes to 93° C. and held during a 60 minute reaction period at 93–96° C.

The mother liquor was decanted from the product and the taffy resin washed free of salt and alkali by introducing hot (90–93° C.) water to the kettle and simultaneously allowing water to flow from the kettle. During the washing period the resin was continuously agitated. In order to force the resin to the bottom of the kettle, the kettle pressure was held at 30 lbs. p. s. i. by introducing compressed air into the kettle. After 3 hours of continuous washing the water coming from the kettle was neutral. The washing was discontinued, as much water as possible was removed from the kettle by syphoning and the resin dried by heating to 149° C. The hot resinous product was poured into a pan to cool.

Attempts to obtain a melting point of this product resulted in further reaction or polymerization on heating, but this product can be dried under a vacuum to minimize further reaction.

*Example 15.*—In a 2 gallon kettle provided with a mechanical stirrer and thermometer was placed 1750 g. water, 229 g. flake sodium hydroxide and 1307 g. Bisphenol-A. After several minutes agitation, 464 g. epichlorohydrin was added to the reaction mixture and the heat turned on. (Ratio of 5.73 mols Bisphenol-A, 5.02 mols epichlorohydrin and 5.73 mols sodium hydroxide). With a combination of exothermic heat of reaction and external heat the reaction temperature was brought to 100° C. and held during a 60 minute reaction period.

The mother liquor was decanted from the product and the taffy resin washed twice with water at 90–93° C. The taffy was very tough and difficult to wash. Approximately 10 cc. concentrated hydrochloric acid was added, most of the water was syphoned from the kettle and 85 g. hi-flash naphtha added. The taffy was washed two more times with water at 93–94° C. and the water was poured off. 85 g. hi-flash naphtha was added to the taffy and the taffy washed again wtih water at 90° C.

The taffy was allowed to sit overnight and then divided into two portions.

An equal weight of methyl cellosolve was added to the first portion and the mixture heated to 103° C. when the taffy went into solution. The solution was made acid to litmus and washed twice with warm water. As much water as possible was removed from the kettle by decantation and the resin dried by heating with agitation to approximately 180° C. The hot resinous product was poured out into an aluminum foil pan to cool. The cold product had a Durran's melting point of 121° C.

An equal weight of cellosolve acetate was added to the second portion and the mixture was washed similarly to the first portion. The cold product had a Durran's melting point of 111° C.

*Example 16.*—In a 2 gallon kettle provided with a mechanical stirrer and thermometer was placed 1750 g. water, 229 g. flake sodium hydroxide and 1307 g. Bisphenol-A. After several minutes agitation, 464 g. epichlorohydrin mixed with 159 g. hi-flash naphtha was added to the reaction mixture and the heat turned on. (Ratio of 5.73 mols Bisphenol-A, 5.02 mols epichlorohydrin and 5.73 mols sodium hydroxide). With a combination of exothermic heat of reaction and external heat the reaction temperature was brought to 99° C. and held during a 60 minute reaction period.

The reaction mixture was acidified with concentrated hydrochloric acid, 200 g. more water added, and the mixture was agitated for 30 minutes more with the heat turned on. The mother liquor was decanted from the product and the taffy resin washed four times with water. As much water as possible was removed from the kettle by decantation and the resin dried by heating wtih agitation to 200° C. The hot resinous product was poured out into an aluminum foil pan to cool.

The cold product had a Durran's melting point of 115° C., a hydroxyl content of 6.78–6.95% and an approximate molecular weight of 1648.

The molecular weight was determined by heating 160 g. of the product with 100 g. of a commercial diglycid ether of Bisphenol having a weight per epoxide of 200, in a stainless steel container with agitation at 200° C. for 1 hour; cooling and determining the weight per epoxide of the final product. From these known quantities a series of calculations was carried out to yield the molecular weight and structure of the product.

This reaction of the product with an epoxide resin, such as the diglycid ether of bisphenol, illustrates one of the uses and applications of such resins, made with an excess of dihydric phenol. These resins are in the nature of high molecular weight dihydric phenols which can advantageously be reacted with aliphatic polyepoxides or with epoxide resins made by reacting dihydric phenols with an excess of epichlorohydrin, in the presence of alkali; and such further reaction of the phenolic resins and of epoxide resins, particularly in the presence of a small amount of an alkaline catalyst such as an amine or phenolate, gives high melting or infusible reaction products.

I claim:

1. The process of producing resins which comprises reacting with heating a chlorhydrin selected from the class which consists of epichlorhydrin and glycerol dichlorhydrin with a dihydric phenol free from reactive groups other than phenolic hydroxyl groups in the presence of sufficient aqueous caustic alkali to combine with the chlorine of the chlorhydrin and with the addition of a small amount, not exceeding about 20% of the resin formed, of an organic solvent having a boiling point above about 100° C., which is free from reactive groups and which is substantially insoluble in water but which is a solvent for the epichlorhydrin and which is a solvent of and forms a solvent-resin mixture with the resin produced, with production of a resilient aqueous resin-solvent system, including a taffy-like resin-solvent mixture layer and an aqueous layer, removing the aqueous layer without preliminary treatment of the taffy-like resin-solvent mixture layer, from said resultant aqueous system, to yield a resin-solvent mixture of taffy-like consistency which can be washed with water to remove salt and any excess alkali at a lower temperature, and at a thinner consistency at the same temperature, than the resin without the solvent, washing the taffy-like resin-solvent mixture with water to remove salt and any excess alkali, and heating the resulting product to free it from residual water.

2. The process of producing epoxide resins which comprises reacting with heating a dihydric phenol free from reactive groups other than phenolic hydroxyl groups with an excess of a chlorhydrin selected from the class which consists of epichlorhydrin and glycerol dichlorhydrin in the presence of sufficient aqueous caustic alkali to combine with the chlorine of the chlorhydrin and with the addition of a small amount, not exceeding about 20% of the resin formed, of an organic solvent having a boiling point above about 100° C., which is free from reactive groups and which is substantially insoluble in water but which is a solvent for the epichlorhydrin and which is a solvent of and forms a solvent-resin mixture with the epoxide resin produced, with production of a resultant aqueous resin-solvent system, including a taffy-like resin-solvent mixture layer and an aqueous layer, removing the aqueous layer without preliminary treatment of the taffy-like resin-solvent mixture layer, from said resultant aqueous system, to yield a resin-solvent mixture of taffy-like consistency which can be washed with water to remove salt and any excess alkali at a lower temperature, and at a thinner consistency at the same temperature, than the resin without the solvent, washing the taffy-like resin-solvent mixture with water to remove salt and any excess alkali, and heating the resulting product to free it from residual water.

3. The process of producing resins with terminal phenolic hydroxyl groups which comprises reacting with heating a chlorhydrin selected from the class which consists of epichlorhydrin and glycerol dichlorhydrin with an excess of a dihydric phenol free from reactive groups other than phenolic hydroxyl groups in the presence of sufficient aqueous caustic alkali to combine with the chlorine of the chlorhydrin and with the addition of a small amount, not exceeding about 20% of the resin formed, of an organic solvent having a boiling point above about 100° C., which is free from reactive groups and which is substantially insoluble in water but which is a solvent for the epichlorhydrin and which is a solvent of and forms a solvent-resin mixture with the resin produced, with production of a resultant aqueous resin-solvent system, including a taffy-like resin-solvent mixture layer and an aqueous layer, removing the aqueous layer without preliminary treatment of the taffy-like resin-solvent mixture layer, from said resultant aqueous system, to yield a resin-solvent mixture of taffy-like consistency which can be washed with water to remove salt and any excess alkali at a lower temperature, and at a thinner consistency at the same temperature, than the resin without the solvent, washing the taffy-like resin-solvent mixture with water to remove salt and any excess alkali, and heating the resulting product to free it from residual water.

4. The process according to claim 1, in which substantially equal proportions of the chlorhydrin and dihydric phenol are used.

5. The process according to claim 2 in which the resin is further heated to remove the solvent therefrom.

6. The process according to claim 2 in which the resulting resin-solvent mixture, after freeing from water, is diluted with additional solvent to form a resin solution.

7. The process according to claim 2 in which the proportions of chlorhydrin and dihydric phenol result in the production of a resin having a melting point above 100° C. and in which the resulting resin-solvent mixture is washed with hot water at a temperature materially below 100° C.

8. The process according to claim 1 in which the dihydric phenol is Bisphenol-A.

9. The process according to claim 2 in which the dihydric phenol is Bisphenol-A.

10. The process according to claim 3 in which the dihydric phenol is Bisphenol-A.

11. The process according to claim 4 in which the dihydric phenol is Bisphenol-A.

12. The process according to claim 5 in which the dihydric phenol is Bisphenol-A.

13. The process according to claim 6 in which the dihydric phenol is Bisphenol-A.

14. The process according to claim 7 in which the dihydric phenol is Bisphenol-A.

15. The single stage process of producing high melting point epoxide resins having a melting point above 115° C. which comprises reacting, in proportions giving such a high melting point resin, a chlorhydrin selected from the class which consists of epichlorhydrin and glycerol dichlorhydrin with a dihydric phenol free from reactive groups other than phenolic hydroxyl groups in the presence of sufficient aqueous caustic alkali to combine with the chlorine of the chlorhydrin and with the addition of a small amount, not exceeding about 20% of the resin formed, of an organic solvent having a boiling point above about 100° C., which is free from reactive groups, which is a solvent of the resin produced and which will lower the melting point of the resin produced and enable it to be produced and washed at temperatures not exceeding the boiling point of water, with the production of a resultant aqueous resin-solvent system, including a taffy-like resin-solvent mixture layer and an aqueous layer, removing the aqueous layer without preliminary treatment of the taffy-like resin-solvent mixture layer, from said resultant aqueous system, to yield a resin-solvent mixture of taffy-like consistency which can be washed with water to remove salt and any excess alkali at a lower temperature, and at a thinner consistency at the same temperature than a resin without the solvent, washing the resin-solvent mixture with hot water at temperatures not exceeding the boiling point of water, and then heating the resulting product to free it from residual water.

References Cited in the file of this patent
UNITED STATES PATENTS

| | | |
|---|---|---|
| 2,493,486 | Greenlee | Jan. 3, 1950 |
| 2,602,075 | Carpenter | July 1, 1952 |
| 2,615,007 | Greenlee | Oct. 21, 1952 |
| 2,668,805 | Greenlee | Feb. 9, 1954 |
| 2,686,771 | Whitehill et al. | Aug. 17, 1954 |

FOREIGN PATENTS

| | | |
|---|---|---|
| 960,044 | France | Oct. 17, 1949 |